US012499896B2

(12) United States Patent
Lee et al.

(10) Patent No.: US 12,499,896 B2
(45) Date of Patent: Dec. 16, 2025

(54) LEARNING DEVICE, METHOD, AND PROGRAM

(71) Applicant: NEC Corporation, Tokyo (JP)

(72) Inventors: Kong Aik Lee, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 18/022,901

(22) PCT Filed: Aug. 28, 2020

(86) PCT No.: PCT/JP2020/032631
§ 371 (c)(1),
(2) Date: Feb. 23, 2023

(87) PCT Pub. No.: WO2022/044269
PCT Pub. Date: Mar. 3, 2022

(65) Prior Publication Data
US 2023/0326463 A1    Oct. 12, 2023

(51) Int. Cl.
*G10L 17/00* (2013.01)
*G10L 17/02* (2013.01)
*G10L 17/04* (2013.01)
*G10L 17/18* (2013.01)

(52) U.S. Cl.
CPC .............. *G10L 17/04* (2013.01); *G10L 17/02* (2013.01); *G10L 17/18* (2013.01)

(58) Field of Classification Search
CPC .......... G10L 17/18; G10L 17/04; G10L 17/02
USPC ....................................................... 704/232
See application file for complete search history.

(56) References Cited

U.S. PATENT DOCUMENTS

| 2019/0355366 A1 | 11/2019 | Ng et al. |
| 2021/0134300 A1* | 5/2021 | Yamamoto .............. G10L 17/04 |

OTHER PUBLICATIONS

International Search Report for PCT Application No. PCT/JP2020/032631, mailed on Oct. 13, 2020.
(Continued)

*Primary Examiner* — Md S Elahee (57) ABSTRACT

Learning means 81 generates a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating a speaker of the voice signal. The speaker embedding extracting neural network includes a network that calculates a first accuracy from a feature in units of frames and calculates an average and a second accuracy of a posterior distribution from an average and an accuracy of a prior distribution and the feature and the first accuracy.

5 Claims, 8 Drawing Sheets

(56) References Cited

OTHER PUBLICATIONS

D. Snyder et al, "X-vectors: robust DNN embeddings for speaker recognition," in Proc. IEEE ICASSP, 2018. pp. 1-5.
K. Okabe, T. Koshinaka, and K. Shinoda, "Attentive statistics pooling for deep speaker embedding", Proc. Interspeech 2018, pp. 2252-2256, Sep. 2018.
Gu, B. et al., "Gaussian speaker embedding learning for text-independent speaker verification", arXiv preprint, arXiv: 2001. 04585, [online], Jan. 14, 2020, [retrieved on Sep. 28, 2020], Internet:<URL:https://arxiv.org/ftp/arxiv/papers/2001/2001. 04585.pdf>, pp. 1-5.

* cited by examiner

LEARNING DEVICE, METHOD, AND PROGRAM

This application is a National Stage Entry of PCT/JP2020/032631 filed on Aug. 28, 2020, the contents of all of which are incorporated herein by reference, in their entirety.

TECHNICAL FIELD

The disclosure relates to a learning device that learns speaker embedding, a learning method and a learning program, a speaker embedding extracting device that extracts speaker embedding, a speaker embedding extracting method and a speaker embedding extracting program, and a learned model.

BACKGROUND ART

A state-of-the-art speaker recognition system is configured by pre-stage speaker embedding followed by post-stage scoring. A recent de facto standard for speaker embedding is an x-vector (refer to NPL 1). In addition, probabilistic linear discriminant analysis (PLDA: probabilistic linear discrimination analysis) is generally used for the post-stage scoring (similarity calculation).

Note that NPL 2 describes a feature extracting method using an x-vector. In the method described in NPL 2, an auxiliary network called a caution mechanism is added to the x-vector to select a place where an individual feature appears more appropriately.

CITATION LIST

Non Patent Literature

NPL 1: D. Snyder et al, "X-vectors: robust DNN embeddings for speaker recognition," in Proc. IEEE ICASSP, 2018.

NPL 2: K. Okabe, T. Koshinaka, and K. Shinoda, "Attentive statistics pooling for deep speaker embedding", Proc. Interspeech 2018, pp. 2252-2256, September 2018.

SUMMARY OF INVENTION

Technical Problem

By considering robustness to noisy data and learning a network by using a large amount of training data, a performance of an extractor can be further improved. In addition, the performance of the extractor can be further improved by various training (for example, multi-class cross-entropy cost, angular margin cost, and the like).

On the other hand, in a general x-vector as described in NPL 1, a frame-level feature is estimated in a state of a certain point. That is, in the general x-vector, estimation is performed without considering a feature uncertainty (distribution). Therefore, there is a problem that robustness to random perturbation (that is, an accidental uncertainty) which is a feature unique to voice is low.

In addition, in the method described in NPL 2, weighting is performed such that a large weight is assigned to an important feature vector and a small weight is assigned to a feature vector having a low importance. However, similarly to the x-vector described in NPL 1, the method described in NPL 2 does not consider the uncertainty unique to voice data at the time of learning. Therefore, there is a problem that robustness to voice data acquired under an actual condition is low.

Therefore, an exemplary object of the disclosure is to provide a learning device capable of learning speaker embedding in consideration of a voice uncertainty, a learning method and a learning program, a speaker embedding extracting device that extracts the speaker embedding, a speaker embedding extracting method and a speaker embedding extracting program, and a learned model.

Solution to Problem

A learning device according to the disclosure includes: learning means for generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, in which the speaker embedding extracting neural network is a neural network to which first to fourth networks are sequentially coupled, and the learning means calculates a feature in units of frames from the voice signal, in the first network, calculates a first accuracy from the feature in units of frames, in the second network, calculates an average and a second accuracy of a posterior distribution from an average and an accuracy of a prior distribution, and the feature and the first accuracy, in the third network, and calculates speaker embedding from the average and the second accuracy of the posterior distribution, in the fourth network, and classifies speakers of the voice signal.

A speaker embedding extracting device according to the disclosure includes: input means for receiving an input of a voice signal; and output means for outputting speaker embedding for the input voice signal, in which the output means outputs the speaker embedding for the input voice signal, by using a speaker embedding extracting neural network in which a weighting factor is learned so as to minimize a loss function indicating an error between a speaker label indicating a speaker of the voice signal and an output value output from an output layer, with respect to a neural network including an input layer that receives the input of the voice signal and the output layer that outputs the output value indicating the speaker of the voice signal, the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and the output means performs an operation based on the learned weighting factor on the voice signal input to the input layer of the first network, and extracts the speaker embedding from an intermediate layer of the fourth neural network.

A learning method according to the disclosure includes: by a computer, generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, in which the speaker embedding extracting neural network is a neural network to which first to fourth networks are sequentially coupled, and when generating the speaker embedding extracting neural network, by the computer, a feature in units of frames is calculated from the voice signal, in the first network, a first accuracy is calculated from the feature in units of frames, in the second network, an average and a second accuracy of a posterior distribution are calculated from an average and an accuracy of a prior distribution, and the feature and the first accuracy, in the third network, and speaker embedding is calculated from the average and the second accuracy of the posterior distribution, in the fourth network, and speakers of the voice signal are classified.

A speaker embedding extracting method according to the disclosure includes: receiving an input of a voice signal; and outputting speaker embedding for the input voice signal, by using a speaker embedding extracting neural network in which a weighting factor is learned so as to minimize a loss function indicating an error between a speaker label indicating a speaker of the voice signal and an output value output from an output layer, with respect to a neural network including an input layer that receives an input of the voice signal and the output layer that outputs the output value indicating the speaker of the voice signal, in which the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and when outputting, an operation is performed based on the learned weighting factor on the voice signal input to the input layer of the first network, and the speaker embedding is extracted from an intermediate layer of the fourth neural network.

A learning program according to the disclosure causes a computer to: execute learning processing of generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, in which the speaker embedding extracting neural network is a neural network to which first to fourth networks are sequentially coupled, and in the learning processing, a feature in units of frames is calculated from the voice signal, in the first network, a first accuracy is calculated from the feature in units of frames, in the second network, an average and a second accuracy of a posterior distribution are calculated from an average and an accuracy of a prior distribution, and the feature and the first accuracy, in the third network, and speaker embedding is calculated from the average and the second accuracy of the posterior distribution, in the fourth network, and speakers of the voice signal are classified.

A speaker embedding extracting program according to the disclosure causes a computer to: execute input processing of receiving an input of a voice signal; and output processing of outputting speaker embedding for the input voice signal, in which in the output processing, the speaker embedding for the input voice signal is output, by using a speaker embedding extracting neural network in which a weighting factor is learned so as to minimize a loss function indicating an error between a speaker label indicating a speaker of the voice signal and an output value output from an output layer, with respect to a neural network including an input layer that receives an input of the voice signal and the output layer that outputs the output value indicating the speaker of the voice signal, the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and in the output processing, an operation is performed based on the learned weighting factor on the voice signal input to the input layer of the first network, and the speaker embedding is extracted from an intermediate layer of the fourth neural network.

A learned model according to the disclosure is a learned model for causing a computer to function so as to output speaker embedding for an input voice signal, in which the learned model is a speaker embedding extracting neural network in which a weighting factor is learned so as to minimize a loss function indicating an error between a speaker label indicating a speaker of the voice signal and an output value output from an output layer, with respect to a neural network including an input layer that receives the input of the voice signal and the output layer that outputs the output value indicating the speaker of the voice signal, the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and the learned model further causes the computer to perform an operation based on the learned weighting factor on the voice signal input to the input layer of the first network, and extract the speaker embedding from an intermediate layer of the fourth neural network.

DESCRIPTION OF EMBODIMENTS

First, the contents of a general x-vector extractor will be described. A general x-vector extractor is a deep neural network (DNN) including the following three functional blocks. A first block is a frame processor implemented by a plurality of layers of time-delay neural networks (TDNNs). A second block is a statistical pooling layer that calculates an average and a standard deviation from the frame-level feature vectors generated by the TDNNs. A third block is a block that performs embedding extraction and utterance classification.

As described above, in the general x-vector extractor, estimation is performed based on a state of a certain point indicating a frame level feature without considering a state including an uncertainty such as noise having some distribution. Therefore, robustness to random perturbation is low. Therefore, in the exemplary embodiment, a learning method of speaker embedding with high robustness in consideration of a feature uncertainty by extending the function of the general x-vector extractor will be described.

Hereinafter, exemplary embodiments of the disclosure will be described with reference to the drawings.

Exemplary Embodiment 1

Figure 1:
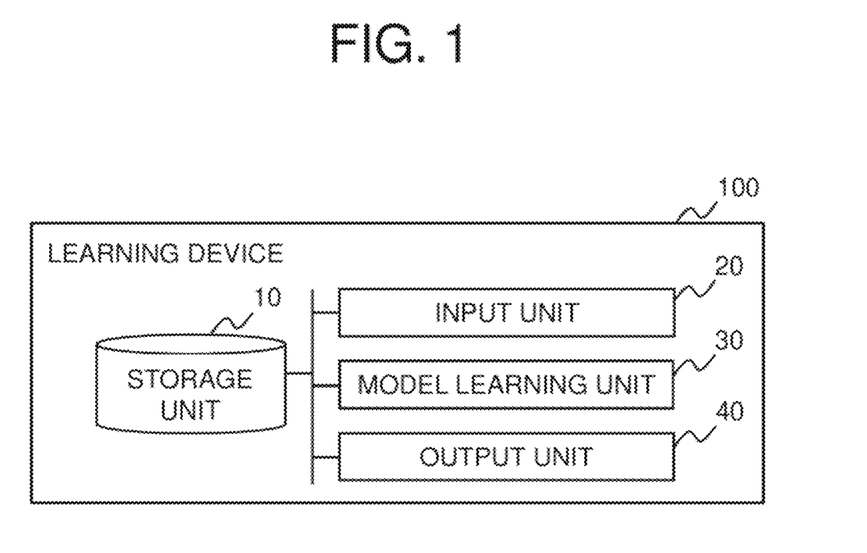
FIG. 1 It depicts a block diagram illustrating a configuration example of an exemplary embodiment of a learning device according to the disclosure.

FIG. 1 is a block diagram illustrating a configuration example of an exemplary embodiment of a learning device according to the disclosure. A learning device 100 of the exemplary embodiment includes a storage unit 10, an input unit 20, a model learning unit 30, and an output unit 40.

The storage unit 10 stores various types of information used for processing by the learning device 100 of the exemplary embodiment. The storage unit 10 may store a structure of a neural network used for learning designed in advance or a parameter. Furthermore, the storage unit 10 may store training data used by the model learning unit 30 to be described later. Note that the input unit 20 to be described later may receive an input of the training data from an external device (not illustrated). The storage unit 10 is realized by, for example, a magnetic disk or the like.

The input unit 20 receives inputs of various types of information used for processing by the learning device 100 of the exemplary embodiment. The input unit 20 may receive an input of the above-described training data, or may receive a neural network or a parameter. Hereinafter, a voice signal input as training data may be referred to as an input signal.

The model learning unit 30 learns a model (specifically, a neural network) for performing feature extraction and speaker classification. The learning of the entire neural network is executed by a general learning method (for example, back propagation or the like). For example, the model learning unit 30 generates a neural network by learning a weighting factor so as to minimize a loss function indicating an error between a correct answer label of input data and an output value. Note that details will be described later.

In the exemplary embodiment, the model learning unit 30 learns the weighting factor of the neural network including an input layer that receives an input of a voice signal and an output layer that outputs an output value indicating a speaker of the voice signal. Hereinafter, the neural network learned in the exemplary embodiment is roughly classified into four networks. A first network is a network that calculates a feature in units of frames from an input signal. A second network is a network that calculates a certainty (accuracy) of the extracted feature. A third network is a network corresponding to a pooling layer that performs statistical processing. A fourth network is a network that performs speaker embedding extraction and utterance classification.

The first to fourth networks are sequentially coupled, and the fourth network including the output layer generates speaker embedding and speaker classification result. Therefore, the neural network learned in the exemplary embodiment can be referred to as a speaker embedding extracting neural network.

First, the model learning unit 30 receives an input signal $x_t$ and generates a precision matrix $L_t$ and a frame feature $o_t$ in units of each time (frame) t. Note that $o_t$ is a vector. Specifically, the model learning unit 30 receives an input signal (input sequence) $\{x_1, x_2, \ldots, x_\tau\}$ as training data, and generates a sequence $\{o_1, o_2, \ldots, o_\tau\}$ indicating a frame feature and a corresponding precision matrix $\{L_1, L_2, \ldots, L_\tau\}$. This processing is processing performed in the first network and the second network described above.

Note that the precision matrix may be expressed by log-precision log $(L_t)$ in consideration of the range of data to be handled. That is, the log-precision log $(L_t)$ is the accuracy estimated for each frame $x_t$. Because $o_t$ and log $(L_t)$ are generated in the first network and the second network, equations that generate $o_t$ and log $(L_t)$ can be expressed by Equations 1 and 2 exemplified below.

$$o_t = f_{NeuralNet}(x_t) \quad \text{(Equation 1)}$$

$$\log(L_t) = g_{NeuralNet}(x_t) \quad \text{(Equation 2)}$$

A method of generating $o_t$ is similar to a method of extracting a frame feature in an existing x-vector. That is, the model learning unit 30 may generate $o_t$ by using a framework (specifically, a layer structure of a neural network) for extracting a feature in the existing x-vector. In addition, any method capable of calculating an accuracy from a feature in units of frames can be applied to the calculation of the log-precision. In the following description, the accuracy calculated by the first network may be referred to as a first accuracy.

Figure 2:
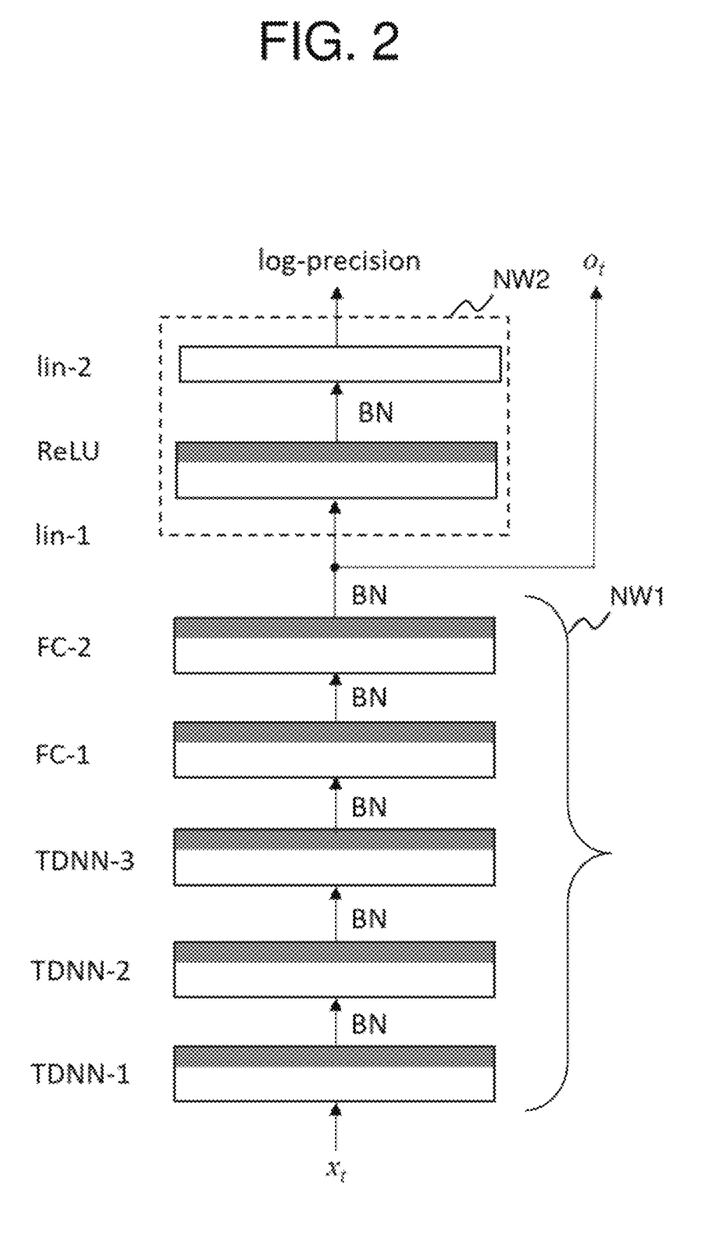
FIG. 2 It depicts an explanatory diagram illustrating an example of a network structure.

FIG. 2 is an explanatory diagram illustrating an example of a network structure that generates the frame feature $o_t$ and the log-precision. FIG. 2 illustrates an example of a first network NW1 and an example of a second network NW2.

The first network NW1 is a network that calculates the feature $o_t$ in units of frames from the voice signal $x_t$, and includes three TDNNs and two fully connected (FC) layers. The TDNN is a time-delay neural network (TDNN) followed by a non-linear activation function (for example, a rectified linear unit (ReLU)). In FIG. 2, the non-linear layer is indicated by a shaded rectangle. The fully connected layer is a linear layer followed by a non-linear activation function. Note that batch normalization (BN) indicates batch normalization used for the purpose of normalization.

In addition, the second network NW2 is a network that calculates the first accuracy from the feature in units of frames, and includes a network including a first linear layer (lin-1: Linear Layer-1) and a subsequent non-linear layer (ReLU), and a second linear layer (lin-2: Linear Layer-2).

However, the network structure illustrated in FIG. 2 is an example. As the first network NW1, any network structure used in the x-vector framework can be applied. Furthermore, as the second network NW2, an arbitrary network structure that receives the frame feature $o_t$ as an input and outputs the log-precision log ($L_t$) can be applied.

Next, the model learning unit 30 calculates an average and an accuracy of a posterior distribution from an average $\mu_p$ and an accuracy $L_p$ of a prior distribution and the generated first accuracy (more specifically, the precision matrix $L_t$), and the frame feature $o_t$. Specifically, the model learning unit 30 performs calculation processing of the average and the accuracy of the posterior distribution in the third network. In the following description, the accuracy calculated by the third network may be referred to as a second accuracy.

Hereinafter, a method of calculating an average $\varphi$, and an accuracy $L_s$ (that is, the second accuracy) of the posterior distribution will be specifically described. First, the model learning unit 30 models the frame feature $o_t$ based on a hidden variable h and an uncertainty $\varepsilon_t$. In the exemplary embodiment, it is assumed that the hidden variable h and the uncertainty $\varepsilon_t$ follow a Gaussian distribution, and the hidden variable h and the uncertainty $\varepsilon_t$ are modeled as Equation 3 exemplified below. Since Equation 3 is expressed by a sum of the hidden variable h and the uncertainty $\varepsilon_t$ each following the Gaussian distribution, it can be said to be a linear Gaussian model.

[Math. 1]

$$o_t = h + \varepsilon_t \quad \text{(Equation 3)}$$

where, $h \sim N(\mu_p, L_p^{-1})$, $\varepsilon_t \sim N(0, L_t^{-1})$

For example, definitions of the linear Gaussian model, the hidden variable, and the uncertainty are stored in the storage unit 10 in advance, and the model learning unit 30 may read these definitions from the storage unit 10, specify the model, and perform the subsequent processing. In an initial state, arbitrary values may be set to the average $\mu_p$ and the accuracy $L_p$ of the prior distribution.

Here, the posterior distribution of the hidden variable h (conditional probability of the hidden variable h in a case where of is given) is defined as Equation 4 exemplified below.

[Math. 2]

$$p(h|o_1, o_2, \ldots, o_\tau) = N(h|\phi_s, L_s^{-1}) \quad \text{(Equation 4)}$$

In this case, the model learning unit 30 calculates the average $\varphi_s$ and the precision matrix $L_s$ of the posterior distribution as in Equations 5 and 6 exemplified respectively below. Equations 5 and 6 can be obtained analytically from Equation 4. When the log-precision log ($L_t$) is calculated, the log-precision log ($L_t$) may be converted into an exponential function in advance.

[Math. 3]

$$\phi_s = L_s^{-1}\left[\sum_{t=1}^{\tau} L_t o_t + L_p \mu_p\right] \quad \text{(Equation 5)}$$

$$L_s = \sum_{t=1}^{\tau} L_t + L_p \quad \text{(Equation 6)}$$

Next, the model learning unit 30 calculates speaker embedding $\xi_s$ and classifies the speakers of the input signal by using the calculated average $\varphi_s$ and the accuracy (more specifically, a variance $\sigma$) of the posterior distribution as inputs. The calculation of the speaker embedding and classification of the speakers are performed in the fourth network operating as a classifier. Therefore, in a case where the classification result is y, an equation for calculating the classification result y can be expressed by Equation 7 exemplified below. Note that y is information for classifying the speakers, and thus can be referred to as a speaker label.

$$y = h_{NeuralNet}(\varphi_s, \sigma_s) \quad \text{(Equation 7)}$$

Figure 3:
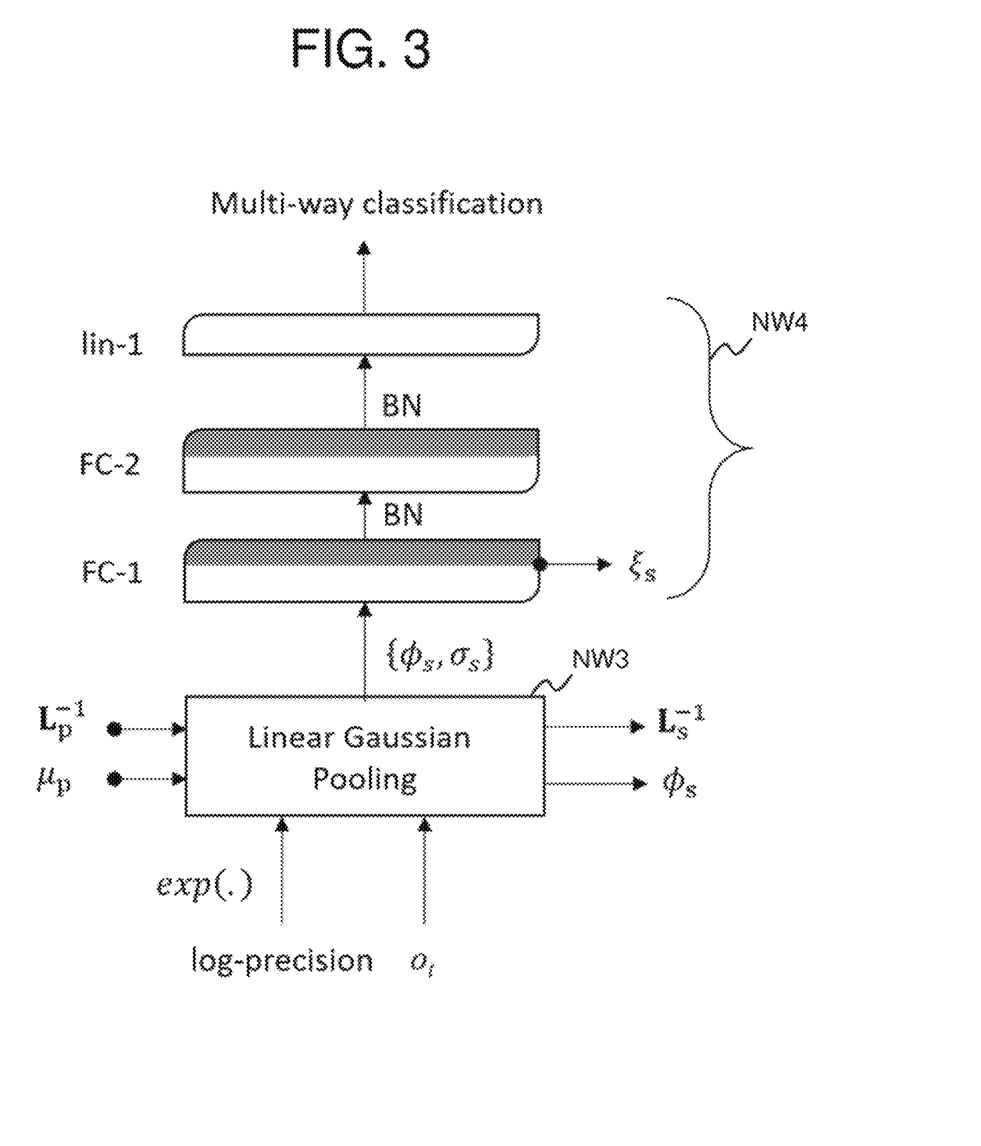
FIG. 3 It depicts an explanatory diagram illustrating an example of a network structure.

Hereinafter, a specific example of the structure of the fourth network will be described. FIG. 3 is an explanatory diagram illustrating an example of the fourth network structure. FIG. 3 illustrates a third network NW3 and a fourth network NW4 coupled to the third network NW3.

In the example illustrated in FIG. 3, the model learning unit 30 acquires the speaker embeddings $\xi_s$ from a pre-activation output in a hidden layer of the fourth network using the average $\varphi_s$ and the variance $\sigma_s$ of the posterior distribution as inputs. Similarly to the x-vector, the model learning unit 30 acquires the classification result from the output layer (lin-1) in which neurons of the number of classes to be classified are set, for example.

When a learned model is used as the x-vector, a network structure from which the lin-1 and the FC-2 layers (and the non-linear layer of the FC-1 layer) are removed may be used.

Note that a method by which the model learning unit 30 learns the entire neural network is arbitrary, and learning may be performed by using a method similar to the existing x-vector. For example, the model learning unit 30 may learn the neural network by performing optimization so as to minimize the loss function. Here, N is a size of a mini-batch, L is a classification loss (for example, multi-class entropy or the like), and $y_0$ is a solution of a one-hot vector. In this case, a loss function J can be expressed by Equation 8 exemplified below.

[Math. 4]

$$J = \frac{1}{N}\sum_{i=1}^{N} L(y, y_o) \quad \text{(Equation 8)}$$

As described above, the model learning unit 30 may learn the entire neural network by a general neural network learning method (for example, back propagation or the like). Note that the content of the loss function described above is an example, and learning may be performed by using a cross entropy error. By constructing and learning such a neural network, it is possible to simultaneously learn the frame feature, the weight of accuracy, and the weight of the prior distribution, so that it is possible to learn speaker embedding in consideration of the voice uncertainty.

The output unit 40 outputs the generated neural network. The output unit 40 may store the generated neural network in the storage unit 10.

The input unit 20, the model learning unit 30, and the output unit 40 are realized by a processor (for example, a central processing unit (CPU) or a graphics processing unit (GPU)) of a computer that operates according to a program (learning program).

For example, the program may be stored in the storage unit 10, and the processor may read the program and operate as the input unit 20, the model learning unit 30, and the output unit 40 according to the program. Furthermore, the functions of the input unit 20, the model learning unit 30, and the output unit 40 may be provided in a software as a service (SaaS) format.

Furthermore, each of the input unit 20, the model learning unit 30, and the output unit 40 may be realized by dedicated hardware. In addition, some or all of the components of each device may be realized by general-purpose or dedicated circuitry, a processor, or the like, or a combination thereof. These may be configured by a single chip or may be configured by a plurality of chips connected via a bus. A part or all of each component of each device may be realized by a combination of the above-described circuit or the like and a program.

Furthermore, in a case where some or all of the components of the input unit 20, the model learning unit 30, and the output unit 40 are realized by a plurality of information processing devices, circuits, and the like, the plurality of information processing devices, circuits, and the like may be disposed in a centralized manner or in a distributed manner. For example, the information processing device, the circuit, and the like may be realized as a form in which each is coupled via a communication network, such as a client server system and a cloud computing system.

Figure 4:
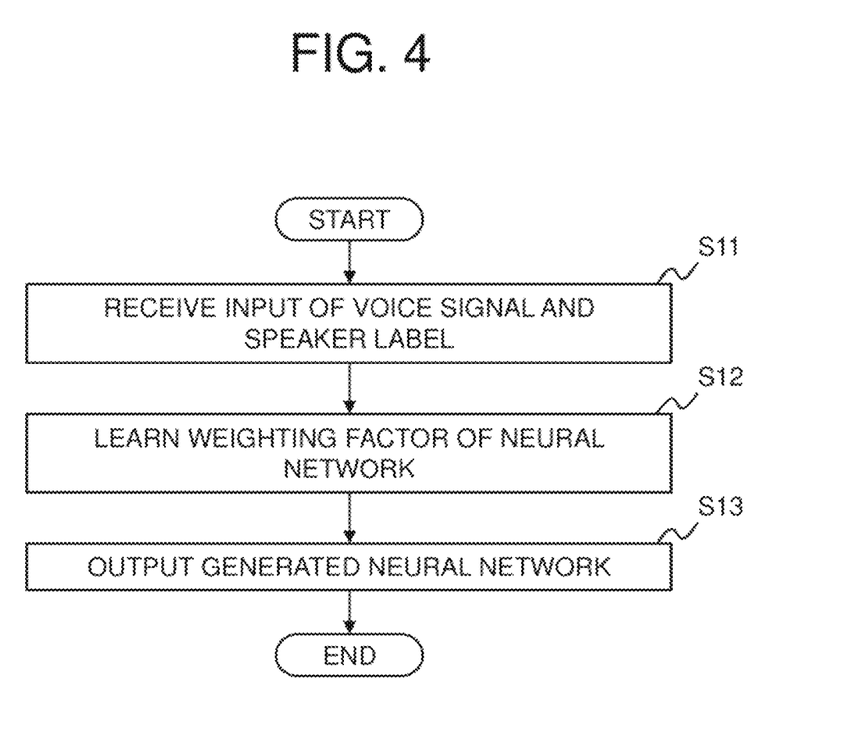
FIG. 4 It depicts a flowchart illustrating an operation example of a learning device.

Next, an operation of the learning device 100 of the exemplary embodiment will be described. FIG. 4 is a flowchart illustrating an operation example of the learning device 100 of the exemplary embodiment. The input unit 20 receives an input of a voice signal and a speaker label (step S11). The model learning unit 30 learns the weighting factor of the neural network to generate a speaker embedding extracting neural network (step S12). Then, the output unit 40 outputs the generated neural network (step S13).

As described above, in the exemplary embodiment, the model learning unit 30 learns the weighting factor so as to minimize the loss function to generate the speaker embedding extracting neural network. At that time, the model learning unit 30 calculates the feature $o_t$ in units of frames from the voice signal $x_t$ in the first network, and calculates the first accuracy $L_t$ from the feature $o_t$ in units of frames in the second network. In addition, the model learning unit 30 calculates the average $\varphi_s$ and a second accuracy $(\sigma_s^{-1})$ of the posterior distribution from the average $\mu_p$ and the accuracy $(L_p)$ of the prior distribution and the feature $o_t$ and the first accuracy (log $(L_t)$) in the third network, calculates the speaker embedding from the average $\varphi_s$ and the second accuracy $(\sigma_s^{-1})$ of the posterior distribution in the fourth network, and classifies the speakers of the voice signal. Therefore, speaker embedding can be learned in consideration of the voice uncertainty.

For example, the statistical pooling layer of the existing x-vector functions as a so-called average pooling layer because the uncertainty is not considered. On the other hand, in the exemplary embodiment, the variance is stochastically calculated in the pooling layer in consideration of the uncertainty (distribution) $L_t$ and assuming the Gaussian distribution. Therefore, it is possible to increase robustness to random perturbation which is a feature unique to voice.

Furthermore, the neural network (speaker embedding extracting neural network) learned by the learning device 100 of the exemplary embodiment can also be said to be a learned model for causing a computer to function to output the speaker embedding for the input voice signal. As described above, the learned model is a speaker embedding extracting neural network in which a weighting factor is learned so as to minimize a loss function indicating an error between a speaker label indicating a speaker of a voice signal and an output value output from an output layer, with respect to a neural network including an input layer that receives an input of the voice signal and an output layer that outputs an output value indicating a speaker of the voice signal.

The speaker embedding extracting neural network is a neural network in which first to fourth networks are sequentially coupled. The speaker embedding extracting neural network includes a first network that calculates a feature in units of frames from a voice signal, a second network that calculates a first accuracy from the feature in units of frames, a third network that calculates an average and a second accuracy of a posterior distribution from an average and an accuracy of a prior distribution and the feature and the first accuracy, and a fourth network that calculates speaker embedding from the average and the second accuracy of the posterior distribution.

With such a learned network, the computer is caused to function to perform an operation based on the learned weighting factor on the voice signal input to the input layer of the first network and extract speaker embedding from an intermediate layer of the fourth neural network. Using such a learned model enables extraction of speaker embedding and speaker classification in consideration of the voice uncertainty.

Exemplary Embodiment 2

Figure 5:
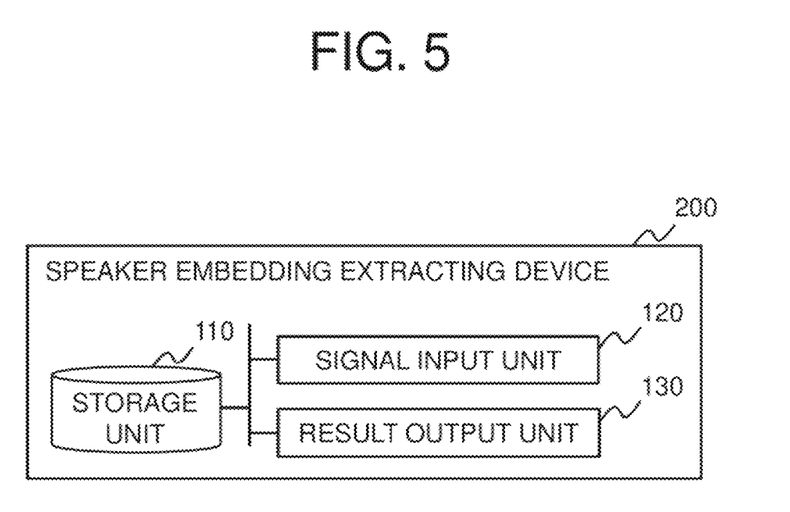
FIG. 5 It depicts a block diagram illustrating a configuration example of an exemplary embodiment of a speaker embedding extracting device.

Next, a second exemplary embodiment of the disclosure will be described. In the second exemplary embodiment, an aspect of a device using the neural network learned in the first exemplary embodiment will be described. FIG. 5 is a block diagram illustrating a configuration example of an exemplary embodiment of a speaker embedding extracting device. The speaker embedding extracting device 200 of the exemplary embodiment includes a storage unit 110, a signal input unit 120, and a result output unit 130.

The storage unit 110 stores various types of information used for processing by the speaker embedding extracting device 200. Specifically, the storage unit 110 of the exemplary embodiment stores the learned model (speaker embedding extracting neural network) generated by the learning device 100 of the first exemplary embodiment. Furthermore, the storage unit 110 may store a voice signal to be processed by the result output unit 130 described later. The storage unit 110 is realized by, for example, a magnetic disk or the like.

The signal input unit 120 receives an input of a voice signal to be processed. Specifically, the signal input unit 120 may receive an input of a voice signal to be extracted for speaker embedding, or may receive an input of a voice signal to be subjected to speaker classification.

The result output unit 130 outputs speaker embedding for the input voice signal by using the speaker embedding extracting neural network. Note that the average and the accuracy of the prior distribution used for the processing may be stored in the storage unit 110 in advance. In addition, for the purpose of the speaker classification, the result output unit 130 may output an output value indicating the speaker of the voice signal by using the speaker embedding extracting neural network.

The signal input unit 120 and the result output unit 130 are realized by a processor of a computer that operates according to a program (speaker embedding extracting program).

As described above, in the exemplary embodiment, the signal input unit 120 receives an input of a voice signal, and the result output unit 130 outputs speaker embedding for the input voice signal by using the speaker embedding extracting neural network. As a result, the input voice signal can be expressed as a feature.

In addition, the result output unit 130 may output an output value indicating the speaker of the voice signal from the average and the second accuracy of the posterior distribution by using the speaker embedding extracting neural network. This makes it possible to estimate the speaker corresponding to the voice signal. In this case, it can be said that the speaker embedding extracting device 200 operates as a speaker classification device.

Figure 6:
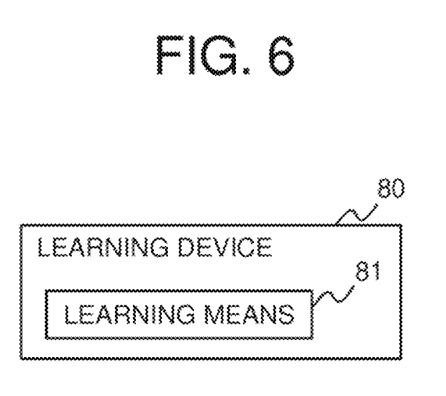
FIG. 6 It depicts a block diagram illustrating an outline of a learning device according to the disclosure.

Next, an outline of the disclosure will be described. FIG. 6 is a block diagram illustrating an outline of a learning device according to the disclosure. A learning device 80 (for example, the learning device 100) according to the disclosure includes learning means 81 (for example, the model learning unit 30) for generating a speaker embedding extracting neural network by learning a weighting factor so as to minimize a loss function (for example, the loss function J of Equation 8 described above) indicating an error between a speaker label indicating the speaker of the voice signal and the output value output from the output layer, with respect to a neural network including an input layer that receives an input of the voice signal and an output layer that outputs an output value indicating the speaker of the voice signal.

Here, the speaker embedding extracting neural network is a neural network in which first to fourth networks are sequentially coupled. Then, the learning means 81 calculates the feature (for example, $o_t$) in units of frames from the voice signal (for example, $x_t$) in the first network (for example, the first network NW1), calculates the first accuracy (for example, $L_t$ and Log ($L_t$)) from the feature in units of frames in the second network (for example, the second network NW2), calculates the average (for example, $\varphi_s$) and the second accuracy (for example, $L_s$) of the posterior distribution from the average (for example, $\mu_p$) and the accuracy (for example, $L_p$) of the prior distribution and the feature and the first accuracy in the third network (for example, the third network NW3), calculates the speaker embedding (for example, $\xi_s$) from the average and the second accuracy of the posterior distribution in the fourth network (for example, the fourth network NW4), and classifies the speakers of the voice signal.

With such a configuration, the speaker embedding can be learned in consideration of the voice uncertainty.

Specifically, the feature in units of frames is defined by a sum (for example, Equation 3 described above) of a hidden variable and a distribution of the uncertainty, the hidden variable follows the Gaussian distribution of an average and an accuracy of a prior distribution, and an uncertainty follows the Gaussian distribution of an average 0 and a first accuracy.

Figure 7:
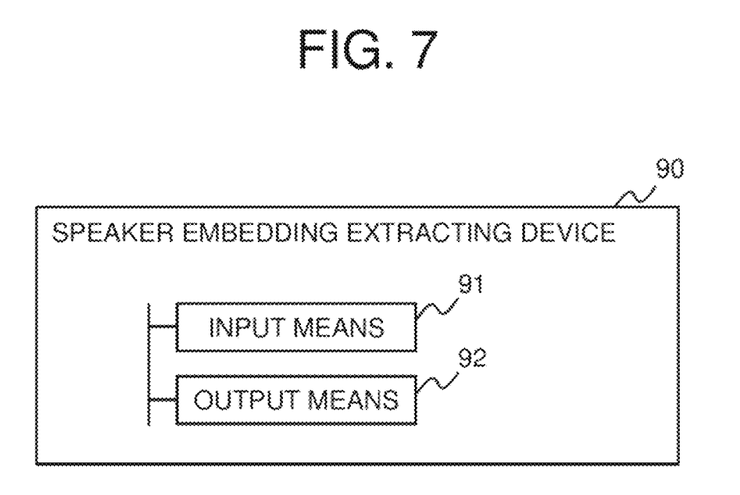
FIG. 7 It depicts a block diagram illustrating an outline of a speaker embedding extracting device according to the disclosure.

FIG. 7 is a block diagram illustrating an outline of the speaker embedding extracting device according to the disclosure. A speaker embedding extracting device 90 (for example, the speaker embedding extracting device 200) according to the disclosure includes input means 91 (for example, the signal input unit 120) for receiving an input of a voice signal, and output means 92 (for example, the result output unit 130) for outputting speaker embedding for the input voice signal.

The output means 92 outputs speaker embedding for the input voice signal, by using a speaker embedding extracting neural network in which a weighting factor is learned so as to minimize a loss function (for example, the loss function J of Equation 8 described above) indicating an error between a speaker label indicating a speaker of the voice signal and the output value output from the output layer, with respect to a neural network including an input layer that receives an input of the voice signal and an output layer that outputs an output value indicating a speaker of the voice signal.

Here, the speaker embedding extracting neural network includes a first network (for example, the first network NW1) that calculates a feature in units of frames from a voice signal, a second network (for example, the second network NW2) that is coupled to the first network and calculates a first accuracy from the feature in units of frames, a third network (for example, the third network NW3) that is coupled to the second network and calculates an average and a second accuracy of a posterior distribution from an average and an accuracy of a prior distribution and the feature and the first accuracy, and a fourth network (for example, the fourth network NW4) that is coupled to the third network and calculates speaker embedding from the average and the second accuracy of the posterior distribution.

Then, the output means 92 performs an operation based on the learned weighting factor on the voice signal input to the input layer of the first network, and extracts speaker embedding from an intermediate layer of the fourth neural network.

With such a configuration, the input voice signal can be expressed as a feature.

In addition, the output means 92 may output the output value indicating the speaker of the voice signal from the average and the second accuracy of the posterior distribution. Such a configuration makes it possible to estimate the speaker corresponding to the voice signal.

Figure 8:
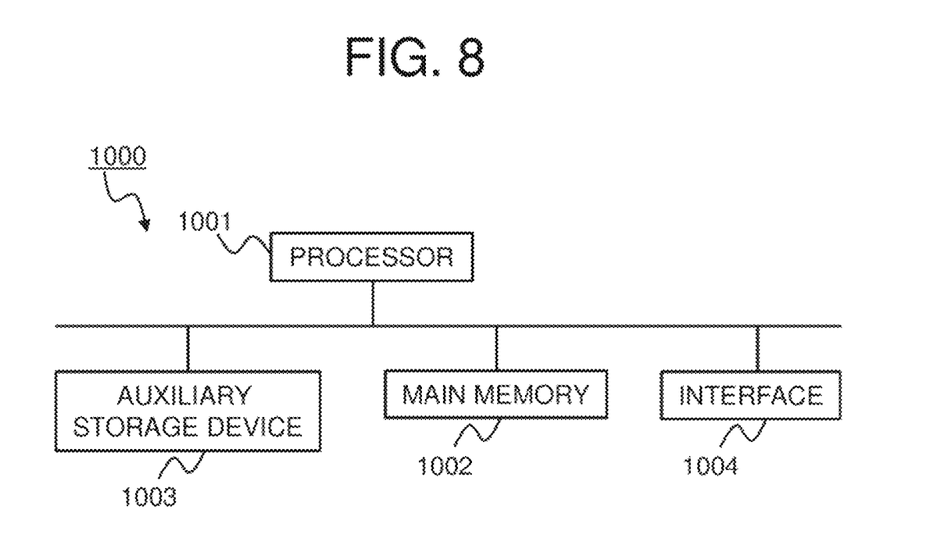
FIG. 8 It depicts a schematic block diagram illustrating a configuration of a computer according to at least one exemplary embodiment.

FIG. 8 is a schematic block diagram illustrating a configuration of a computer according to at least one exemplary embodiment. A computer 1000 includes a processor 1001, a main storage device 1002, an auxiliary storage device 1003, and an interface 1004.

The learning device 80 or the speaker embedding extracting device 90 described above is implemented in the computer 1000. Then, the operation of each processing unit described above is stored in the auxiliary storage device 1003 in the form of a program. The processor 1001 reads the program from the auxiliary storage device 1003, develops the program in the main storage device 1002, and executes the above processing according to the program.

Note that, in at least one exemplary embodiment, the auxiliary storage device 1003 is an example of a non-transitory tangible medium. Other examples of the non-transitory tangible medium include a magnetic disk, a magneto-optical disk, a compact disc read-only memory (CD-ROM), a digital versatile disc read-only memory (DVD-ROM), a semiconductor memory, and the like coupled via the interface 1004. Furthermore, in a case where this program is distributed to the computer 1000 via a communication line, the computer 1000 that has received the distribution may develop the program in the main storage device 1002 and execute the above processing.

Moreover, the program may be for realizing a part of the functions described above. Furthermore, the program may be a program that realizes the above-described functions in combination with another program already stored in the auxiliary storage device 1003, a so-called difference file (difference program).

Some or all of the above exemplary embodiments may be described as the following supplementary notes, but are not limited to the following.

(Supplementary note 1) A learning device including:
  learning means for generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal,
  in which the speaker embedding extracting neural network is a neural network to which first to fourth networks are sequentially coupled, and
  the learning means
  calculates a feature in units of frames from the voice signal, in the first network,
  calculates a first accuracy from the feature in units of frames, in the second network,
  calculates an average and a second accuracy of a posterior distribution from an average and an accuracy of a prior distribution, and the feature and the first accuracy, in the third network, and
  calculates speaker embedding from the average and the second accuracy of the posterior distribution, in the fourth network, and classifies speakers of the voice signal.

(Supplementary note 2) The learning device according to supplementary note 1, in which the feature in units of frames is defined by a sum of a hidden variable and a distribution of uncertainties, the hidden variable follows a Gaussian distribution of the average and the accuracy of the prior distribution, and the uncertainty follows a Gaussian distribution of an average 0 and the first accuracy.

(Supplementary note 3) A speaker embedding extracting device including:
  input means for receiving an input of a voice signal; and
  output means for outputting speaker embedding for the input voice signal,
  in which the output means outputs the speaker embedding for the input voice signal, by using a speaker embedding extracting neural network in which a weighting factor is learned so as to minimize a loss function indicating an error between a speaker label indicating a speaker of the voice signal and an output value output from an output layer, with respect to a neural network including an input layer that receives the input of the voice signal and the output layer that outputs the output value indicating the speaker of the voice signal,
  the speaker embedding extracting neural network includes
  a first network that calculates a feature in units of frames from the voice signal,
  a second network that is coupled to the first network and calculates a first accuracy from the feature in units of frames,
  a third network that is coupled to the second network and calculates an average and a second accuracy of a posterior distribution from an average and an accuracy of a prior distribution, and the feature and the first accuracy, and
  a fourth network that is coupled to the third network and calculates the speaker embedding from the average and the second accuracy of the posterior distribution, and
  the output means performs an operation based on the learned weighting factor on the voice signal input to the input layer of the first network, and extracts the speaker embedding from an intermediate layer of the fourth neural network.

(Supplementary note 4) The speaker embedding extracting device according to supplementary note 3, in which the output means outputs the output value indicating the speaker of the voice signal from the average and the second accuracy of the posterior distribution.

(Supplementary note 5) A learning method including, by a computer:
  generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal,
  in which the speaker embedding extracting neural network is a neural network to which first to fourth networks are sequentially coupled, and
  when generating the speaker embedding extracting neural network, by the computer,
  a feature in units of frames is calculated from the voice signal, in the first network,
  a first accuracy is calculated from the feature in units of frames, in the second network,
  an average and a second accuracy of a posterior distribution are calculated from an average and an accuracy of a prior distribution, and the feature and the first accuracy, in the third network, and
  speaker embedding is calculated from the average and the second accuracy of the posterior distribution, in the fourth network, and speakers of the voice signal are classified.

(Supplementary note 6) A speaker embedding extracting method including:
  receiving an input of a voice signal; and
  outputting speaker embedding for the input voice signal, by using a speaker embedding extracting neural network in which a weighting factor is learned so as to minimize a loss function indicating an error between a speaker label indicating a speaker of the voice signal and an output value output from an output layer, with respect to a neural network including an input layer that receives an input of the voice signal and the output layer that outputs the output value indicating the speaker of the voice signal,
  in which the speaker embedding extracting neural network includes
  a first network that calculates a feature in units of frames from the voice signal,
  a second network that is coupled to the first network and calculates a first accuracy from the feature in units of frames,
  a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and when outputting, an operation is performed based on the learned weighting factor on the voice signal input to the input layer of the first network, and the speaker embedding is extracted from an intermediate layer of the fourth neural network.

(Supplementary note 7) A program storage medium storing a learning program for causing a computer to:

execute learning processing of generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, in which the speaker embedding extracting neural network is a neural network to which first to fourth networks are sequentially coupled, and in the learning processing, a feature in units of frames is calculated from the voice signal, in the first network, a first accuracy is calculated from the feature in units of frames, in the second network, an average and a second accuracy of a posterior distribution are calculated from an average and an accuracy of a prior distribution, and the feature and the first accuracy, in the third network, and speaker embedding is calculated from the average and the second accuracy of the posterior distribution, in the fourth network, and speakers of the voice signal are classified.

(Supplementary note 8) A program storage medium storing a speaker embedding extracting program for causing a computer to:

execute input processing of receiving an input of a voice signal; and output processing of outputting speaker embedding for the input voice signal, in which in the output processing, the speaker embedding for the input voice signal is output, by using a speaker embedding extracting neural network in which a weighting factor is learned so as to minimize a loss function indicating an error between a speaker label indicating a speaker of the voice signal and an output value output from an output layer, with respect to a neural network including an input layer that receives an input of the voice signal and the output layer that outputs the output value indicating the speaker of the voice signal, the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and in the output processing, an operation is performed based on the learned weighting factor on the voice signal input to the input layer of the first network, and the speaker embedding is extracted from an intermediate layer of the fourth neural network.

(Supplementary note 9) A learned model for causing a computer to function so as to output speaker embedding for an input voice signal, in which the learned model is a speaker embedding extracting neural network in which a weighting factor is learned so as to minimize a loss function indicating an error between a speaker label indicating a speaker of the voice signal and an output value output from an output layer, with respect to a neural network including an input layer that receives the input of the voice signal and the output layer that outputs the output value indicating the speaker of the voice signal, the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and the learned model further causes the computer to perform an operation based on the learned weighting factor on the voice signal input to the input layer of the first network, and extract the speaker embedding from an intermediate layer of the fourth neural network.

(Supplementary note 10) The learned model according to supplementary note 9, in which the feature in units of frames is defined by a sum of a hidden variable and a distribution of uncertainties, the hidden variable follows a Gaussian distribution of the average and the accuracy of the prior distribution, and the uncertainty follows a Gaussian distribution of an average 0 and the first accuracy.

(Supplementary note 11) A learning program for causing a computer to:

execute learning processing of generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, in which the speaker embedding extracting neural network is a neural network to which first to fourth networks are sequentially coupled, and in the learning processing, a feature in units of frames is calculated from the voice signal, in the first network, a first accuracy is calculated from the feature in units of frames, in the second network, an average and a second accuracy of a posterior distribution are calculated from an average and an accuracy of a prior distribution, and the feature and the first accuracy, in the third network, and speaker embedding is calculated from the average and the second accuracy of the posterior distribution, in the fourth network, and speakers of the voice signal are classified.

(Supplementary note 12) A speaker embedding extracting program for causing a computer to:

execute input processing of receiving an input of a voice signal; and output processing of outputting speaker embedding for the input voice signal, in which in the output processing, the speaker embedding for the input voice signal is output, by using a speaker embedding extracting neural network in which a weighting factor is learned so as to minimize a loss function indicating an error between a speaker label indicating a speaker of the voice signal and an output value output from an output layer, with respect to a neural network including an input layer that receives the input of the voice signal and the output layer that outputs the output value indicating the speaker of the voice signal, the speaker embedding extracting neural network includes a first network that calculates a feature in units of frames from the voice signal, a second network that is coupled to the first network and calculates a first accuracy from the feature in units of frames, a third network that is coupled to the second network and calculates an average and a second accuracy of a posterior distribution from an average and an accuracy of a prior distribution, and the feature and the first accuracy, and a fourth network that is coupled to the third network and calculates the speaker embedding from the average and the second accuracy of the posterior distribution, and in the output processing, an operation is performed based on the learned weighting factor on the voice signal input to the input layer of the first network, and the speaker embedding is extracted from an intermediate layer of the fourth neural network.

Although the disclosure has been described above with reference to the exemplary embodiments, the disclosure is not limited to the above exemplary embodiments. Various modifications that can be understood by those skilled in the art can be made to the configuration and details of the disclosure within the scope of the disclosure.

REFERENCE SIGNS LIST

10 Storage unit
20 Input unit
30 Model learning unit
40 Output unit
100 Learning device
110 Storage unit
120 Signal input unit
130 Result output unit
200 Speaker embedding extracting device

What is claimed is:

1. A learning device comprising:

a memory storing instructions; and one or more processors configured to execute the instructions to:

generate a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, wherein the speaker embedding extracting neural network is a neural network to which a first network, a second network, a third network and a fourth network are sequentially coupled, and the processor is configured to execute the instructions to:

calculate a feature in units of frames from the voice signal, in the first network;

calculate a first accuracy from the feature in units of frames, in the second network;

calculate an average and a second accuracy of a posterior distribution from an average and an accuracy of a prior distribution, and the feature and the first accuracy, in the third network; and calculate speaker embedding from the average and the second accuracy of the posterior distribution, in the fourth network, and classify speakers of the voice signal.

2. The learning device according to claim 1, wherein the feature in units of frames is defined by a sum of a hidden variable and a distribution of uncertainties, the hidden variable follows a Gaussian distribution of the average and the accuracy of the prior distribution, and the uncertainty follows a Gaussian distribution of an average 0 and the first accuracy.

3. A speaker embedding extracting device comprising:

a memory storing instructions; and one or more processors configured to execute the instructions to:

receive an input of a voice signal; and output speaker embedding for the input voice signal, by using a speaker embedding extracting neural network in which a weighting factor is learned so as to minimize a loss function indicating an error between a speaker label indicating a speaker of the voice signal and an output value output from an output layer, with respect to a neural network including an input layer that receives the input of the voice signal and the output layer that outputs the output value indicating the speaker of the voice signal, wherein the speaker embedding extracting neural network includes:

a first network that calculates a feature in units of frames from the voice signal;

a second network that is coupled to the first network and calculates a first accuracy from the feature in units of frames;

a third network that is coupled to the second network and calculates an average and a second accuracy of a posterior distribution from an average and an accuracy of a prior distribution, and the feature and the first accuracy; and a fourth network that is coupled to the third network and calculates the speaker embedding from the average and the second accuracy of the posterior distribution, and the processor is configured to execute the instructions to perform an operation based on the learned weighting factor on the voice signal input to the input layer of the first network, and extract the speaker embedding from an intermediate layer of the fourth network.

4. The speaker embedding extracting device according to claim 3, wherein the processor is configured to execute the instructions to output the output value indicating the speaker of the voice signal from the average and the second accuracy of the posterior distribution.

5. A learning method performed by a computer and comprising:

generating a speaker embedding extracting neural network by learning a weighting factor so as to minimize a loss function indicating an error between a speaker label indicating a speaker of a voice signal and an output value output from an output layer, with respect to a neural network including an input layer that receives an input of the voice signal and the output layer that outputs the output value indicating the speaker of the voice signal, wherein the speaker embedding extracting neural network is a neural network to which a first network, a second network, a third network and a fourth network are sequentially coupled, and when generating the speaker embedding extracting neural network, by the computer, a feature in units of frames is calculated from the voice signal, in the first network, a first accuracy is calculated from the feature in units of frames, in the second network, an average and a second accuracy of a posterior distribution are calculated from an average and an accuracy of a prior distribution, and the feature and the first accuracy, in the third network, and speaker embedding is calculated from the average and the second accuracy of the posterior distribution, in the fourth network, and speakers of the voice signal are classified.

* * * * *